(12) United States Patent
So

(10) Patent No.: US 12,475,526 B2
(45) Date of Patent: Nov. 18, 2025

(54) COMPUTING SYSTEM WITH A MAP AUTO-ZOOM MECHANISM AND METHOD OF OPERATION THEREOF

(71) Applicant: TeleNav, Inc., Santa Clara, CA (US)

(72) Inventor: Herman Ho-Man So, San Carlos, CA (US)

(73) Assignee: Telenav, Inc., Santa Clara, CA (US)

( * ) Notice: Subject to any disclaimer, the term of this patent is extended or adjusted under 35 U.S.C. 154(b) by 380 days.

(21) Appl. No.: 17/161,393

(22) Filed: Jan. 28, 2021

(65) Prior Publication Data

US 2022/0237733 A1    Jul. 28, 2022

(51) Int. Cl.
    *G06T 3/40*      (2024.01)
    *G01C 21/36*      (2006.01)
    *G06F 18/24*      (2023.01)
    *G06V 20/56*      (2022.01)
    *G08G 1/052*      (2006.01)
    *G08G 1/0967*      (2006.01)

(52) U.S. Cl.
CPC ............ *G06T 3/40* (2013.01); *G01C 21/3647* (2013.01); *G01C 21/367* (2013.01); *G06F 18/24* (2023.01); *G06V 20/588* (2022.01); *G08G 1/052* (2013.01); *G08G 1/0967* (2013.01)

(58) Field of Classification Search
CPC ............ G01C 21/165; G01C 21/3415; G01C 21/367; G01C 21/3647; G01C 21/3815; G01C 21/3667; G01C 21/3614; G06K 9/6267; G06T 3/40; G06T 15/10; G06T 15/20; G06T 17/05; G06T 19/003; G06V 20/588; G08G 1/052; G08G 1/0967; G09G 5/227; G09G 5/391; G09G 2340/04; H04N 1/40068; H04N 9/3188; H04N 25/42

See application file for complete search history.

(56) References Cited

U.S. PATENT DOCUMENTS

| | | | |
|---|---|---|---|
| 5,612,881 A * | 3/1997 | Moroto | ............ G01C 21/3673 |
| | | | 701/428 |
| 5,838,562 A | 11/1998 | Gudat et al. | |
| 7,391,423 B1 * | 6/2008 | Manzari | ................ G06T 3/4092 |
| | | | 715/764 |
| 8,032,297 B2 | 10/2011 | Jakobson | |
| 8,527,907 B2 * | 9/2013 | Goshey | ................... G06F 9/451 |
| | | | 715/764 |
| 9,415,777 B2 | 8/2016 | Clarke et al. | |
| 9,510,039 B2 * | 11/2016 | Young | ................. H04N 21/4316 |

(Continued)

FOREIGN PATENT DOCUMENTS

EP      1371947 A1    12/2003
WO    2009143903 A1    12/2009

*Primary Examiner* — Christian Chace
*Assistant Examiner* — Nicholas Stryker
(74) *Attorney, Agent, or Firm* — Perspectives Law Group, Corp.

(57) ABSTRACT

A system and method of operation of a computing system comprising: determining a current road type for a current road segment based on a current location located along the current road segment; generating a current zoom level of a map including the current location on the current road segment based on the current road type; generating a camera view of the map based on a look ahead distance for the current road type; and communicating the current zoom level for displaying the current location along the current road segment.

20 Claims, 7 Drawing Sheets

(56) References Cited

U.S. PATENT DOCUMENTS

| | | | |
|---|---|---|---|
| 9,857,193 B2 | 1/2018 | Vulcano et al. | |
| 10,156,455 B2 | 12/2018 | Bennett et al. | |
| 2004/0117109 A1* | 6/2004 | Kodani | G01C 21/3896 340/995.12 |
| 2007/0078599 A1* | 4/2007 | Yoshioka | G01C 21/367 701/454 |
| 2007/0277100 A1 | 11/2007 | Sheha et al. | |
| 2008/0275645 A1 | 11/2008 | Hoshino | |
| 2009/0138194 A1* | 5/2009 | Geelen | G01C 21/367 701/533 |
| 2009/0183083 A1* | 7/2009 | Hedges | G06F 3/04817 707/E17.018 |
| 2009/0281720 A1 | 11/2009 | Jakobson | |
| 2011/0007074 A1* | 1/2011 | Sakashita | G01C 21/367 345/428 |
| 2011/0231090 A1* | 9/2011 | Ikeuchi | G01C 21/367 701/533 |
| 2012/0158290 A1* | 6/2012 | Bharathan | G01C 21/3632 701/425 |
| 2013/0322634 A1 | 12/2013 | Bennett et al. | |
| 2014/0365126 A1 | 12/2014 | Vulcano et al. | |
| 2016/0052514 A1 | 2/2016 | Clarke et al. | |
| 2016/0291852 A1* | 10/2016 | Kim | G01C 21/367 |
| 2016/0328114 A1* | 11/2016 | Santhakumar | G06F 3/1454 |
| 2018/0348000 A1* | 12/2018 | Cai | G01C 21/367 |
| 2019/0212162 A1* | 7/2019 | Sata | G01C 21/3691 |
| 2019/0368889 A1* | 12/2019 | Torschmied | G01C 21/365 |

* cited by examiner

COMPUTING SYSTEM WITH A MAP
AUTO-ZOOM MECHANISM AND METHOD
OF OPERATION THEREOF

TECHNICAL FIELD

An embodiment of the present invention relates generally to a computing system and more particularly to a computing system with an auto-zoom mechanism.

BACKGROUND

Modern consumer and industrial electronics, especially devices such as cellular phones, smart phones, tablet computers, laptops, vehicle integrated computing and communication systems, vehicle navigation systems, portable digital assistants, and combination devices, are providing increasing levels of functionality to support modern life including communication services. Research and development in the existing technologies can take a myriad of different directions.

Users of connected computing systems (i.e. systems that use connectivity to provide navigation information like maps, Points of Interest (POIs), street names, directions, traffic conditions, speed limits, etc.) often rely on the presentation of a map for guidance on a route, locating destinations, and navigating a maneuver. However, users are often challenged by the usability while traveling to provide the optimal amount of map information.

Thus, a need still remains for a computing system with an auto-zoom mechanism and method to improve the usability. In view of the ever-increasing commercial competitive pressures, along with growing consumer expectations and the diminishing opportunities for meaningful product differentiation in the marketplace, it is increasingly critical that answers be found to these problems. Additionally, the need to improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a method of operation of a computing system comprising: determining a current road type for a current road segment based on a current location located along the current road segment; generating a current zoom level of a map including the current location on the current road segment based on the current road type; generating a camera view of the map based on a look ahead distance for the current road type; and communicating the current zoom level for displaying the current location along the current road segment.

An embodiment of the present invention provides a computing system comprising: a control unit configured to: determine a current road type for a current road segment based on a current location located along the current road segment; generate a current zoom level of a map including the current location on the current road segment based on the current road type; generate a camera view of the map based on a look ahead distance for the current road type; and communicate the current zoom level for displaying the current location along the current road segment.

An embodiment of the present invention provides a non-transitory computer readable medium including instructions for a computing system comprising: determining a current road type for a current road segment based on a current location located along the current road segment; generating a current zoom level of a map including the current location on the current road segment based on the current road type; generating a camera view of the map based on a look ahead distance for the current road type; and communicating the current zoom level for displaying the current location along the current road segment.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
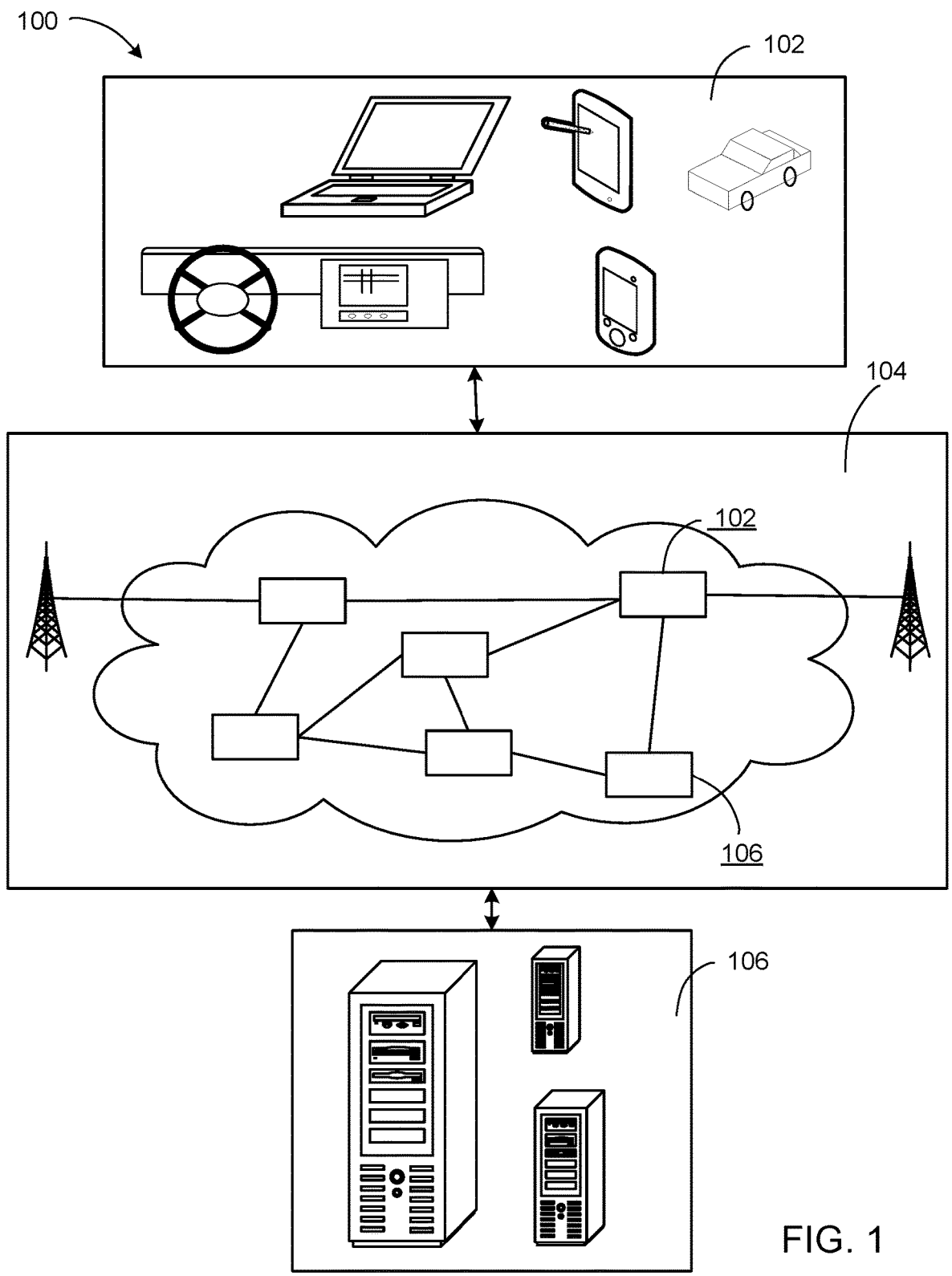
FIG. 1 is a computing system with an auto-zoom mechanism in an embodiment of the present invention.

Embodiments provide the computing system can increase the presentation of the map to the user by automatically adjusting the zoom level of the map. The auto-zoom mechanism provides for the display of the map at a zoom level based on the speed limit of the current location of the user to provide a look ahead distance.

Embodiments provide the computing system can detect a change in the speed limit for a road segment based on the current location of the user. The correct detection of the change in the speed limit allows for a transition by the computing system that improves operator awareness.

Embodiments provide the computing system can set a zoom level by determining a road type when the speed limit is unavailable. The setting of a zoom level based on a road type allows the computing system with an auto-zoom mechanism to function even when the speed limit of the current location of the user cannot be determined.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The embodiments have been numbered first embodiment, second embodiment, etc. as a matter of descriptive convenience and are not intended to have any other significance or provide limitations for an embodiment of the present invention. The terms first, second, etc. can be used throughout as part of element names and are used as a matter of descriptive convenience and are not intended to have any other significance or provide limitations for an embodiment.

The term "vehicle" referred to herein can include cars, self-driving cars, trains, buses, bicycles, boats, motorcycles, carts, airplanes, helicopters, or any other mode of transport, or a combination thereof in an embodiment of the present invention in accordance with the context in which the term is used.

The term "module" or "unit" referred to herein can include software, hardware, or a combination thereof in an embodiment of the present invention in accordance with the context in which the term is used. For example, the software can be machine code, firmware, embedded code, and application software. The software can also include a function, a call to a function, a code block, or a combination thereof. Also for example, the hardware can be circuitry, processor, a special purpose computer, integrated circuit, integrated circuit cores, a pressure sensor, an inertial sensor, a microelectromechanical system (MEMS), passive devices, or a combination thereof. Further, if a module is written in the system claims section below, the modules are deemed to include hardware circuitry for the purposes and the scope of system claims.

The modules in the following description of the embodiments can be coupled to one another as described or as shown. The coupling can be direct or indirect without or with, respectively, intervening items between coupled items. The coupling can be by physical contact or by communication between items.

Referring now to FIG. 1, therein is shown a computing system 100 with an auto-zoom mechanism in an embodiment of the present invention. The computing system 100 includes a first device 102, such as a client or a server, connected to a second device 106, such as a client or server. The first device 102 can communicate with the second device 106 along a communication path 104, such as a wireless or wired network.

For example, the first device 102 can be of any of a variety of devices, such as a smart phone, cellular phone, personal digital assistant, tablet computer, a notebook computer, laptop computer, desktop computer, vehicle embedded navigation system, or vehicle integrated communication system. The first device 102 can couple, either directly or indirectly, to the communication path 104 to communicate with the second device 106 or can be a stand-alone device. The first device 102 can be incorporated in a vehicle.

The second device 106 can be any of a variety of centralized or decentralized computing devices. For example, the second device 106 can be a laptop computer, a multimedia computer, a desktop computer, grid-computing resources, a virtualized computer resource, cloud computing resources, routers, switches, peer-to-peer distributed computing devices, a server, or a combination thereof. The second device 106 can be mounted externally or internally to a vehicle, centralized in a single room, distributed across different rooms, distributed across different geographical locations, embedded within a telecommunications network. The second device 106 can couple with the communication path 104 to communicate with the first device 102.

For illustrative purposes, the computing system 100 is shown with the first device 102 as a client device, although it is understood that the computing system 100 can have the first device 102 as a different type of device. For example, the first device 102 can be a server. Also for illustrative purposes, the computing system 100 is shown with the second device 106 as a server, although it is understood that the computing system 100 can have the second device 106 as a different type of device. For example, the second device 106 can be a client device.

For brevity of description in the embodiments discussed below, the first device 102 will be described as a client device and the second device 106 will be described as a server device. The embodiments of the present invention, however, are not limited to this selection for the type of devices. The selection is an example of an embodiment of the present invention.

Also for illustrative purposes, the computing system 100 is shown with the second device 106 and the first device 102 as end points of the communication path 104, although it is understood that the computing system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical communication, ultrasonic communication, or the combination thereof. For example, satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Cable, Ethernet, digital subscriber line (DSL), fiber optic lines, fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
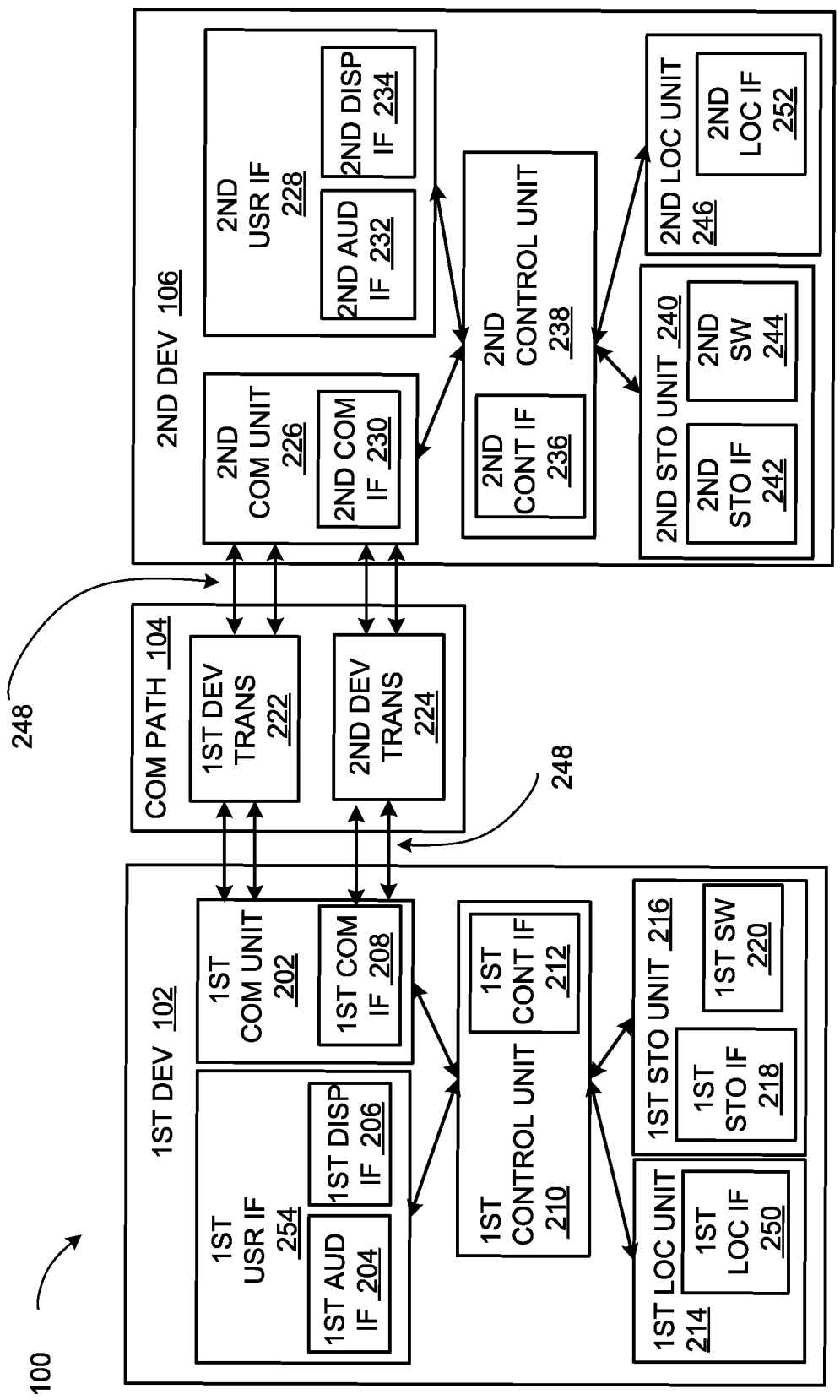
FIG. 2 is an exemplary block diagram of the components of the computing system.

Referring now to FIG. 2, therein is shown an exemplary block diagram of the components of the computing system 100. The computing system 100 can include the first device 102, the communication path 104, and the second device 106. The first device 102 can send information in a first device transmission 222 over the communication path 104 to the second device 106. The second device 106 can send information in a second device transmission 224 over the communication path 104 to the first device 102. The first device transmission 222 and the second device transmission 224 can be sent over one or more communication channels 248. A communication channel 248 refers either to a physical transmission medium such as a wire, or to a logical connection over a multiplexed medium such as a radio channel.

For illustrative purposes, the computing system 100 is shown with the first device 102 as a client device, although it is understood that the computing system 100 can have the first device 102 as a different type of device. For example, the first device 102 can be a server including a display interface.

Also for illustrative purposes, the computing system 100 is shown with the second device 106 as a server, although it is understood that the computing system 100 can have the second device 106 as a different type of device. For example, the second device 106 can be a client device.

Further, for illustrative purposes, the computing system 100 is shown with interaction between the first device 102 and the second device 106, although it is understood that the first device 102 can similarly interact with another instance of the first device 102. Similarly, the second device 106 can similarly interact with another instance of the second device 106.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 210, a first storage unit 216, a first communication unit 202, a first user interface 254, and a first location unit 214. The first control unit 210 can include a first control interface 212. The first control unit 210 can execute a first software 220 to provide the intelligence of the computing system 100.

The first control unit 210 can be implemented in a number of different ways. For example, the first control unit 210 can be a processor, an application specific integrated circuit (ASIC), an embedded processor, a microprocessor, a hardware control logic, a hardware finite state machine (FSM), a digital signal processor (DSP), or a combination thereof. The first control interface 212 can be used for communication between the first control unit 210 and other functional units in the first device 102. The first control interface 212 can also be used for communication that is external to the first device 102.

The first control interface 212 can receive information from the other functional units or circuits or from external sources, or can transmit information to the other functional units or circuits or to external destinations. The external sources and the external destinations refer to sources and destinations external to the first device 102.

The first control interface 212 can be implemented in different ways and can include different implementations depending on which functional units or circuits or external units or circuits are being interfaced with the first control interface 212. For example, the first control interface 212 can be implemented with a pressure sensor, an inertial sensor, a microelectromechanical system (MEMS), optical circuitry, waveguides, wireless circuitry, wireline circuitry, application programming interface, or a combination thereof.

The first storage unit 216 can store the first software 220. The first storage unit 216 can also store the relevant information, such as data representing incoming images, data representing previously presented image, sound files, or a combination thereof. For illustrative purposes, the first storage unit 216 is shown as a single element, although it is understood that the first storage unit 216 can be a distribution of storage elements.

Also for illustrative purposes, the computing system 100 is shown with the first storage unit 216 as a single hierarchy storage system, although it is understood that the computing system 100 can have the first storage unit 216 in a different configuration. For example, the first storage unit 216 can be formed with different storage technologies forming a memory hierarchal system including different levels of caching, main memory, rotating media, or off-line storage.

The first storage unit 216 can be a volatile memory, a nonvolatile memory, an internal memory, an external memory, or a combination thereof. For example, the first storage unit 216 can be a nonvolatile storage such as non-volatile random access memory (NVRAM), Flash memory, disk storage, or a volatile storage such as static random access memory (SRAM).

The first storage unit 216 can include a first storage interface 218. The first storage interface 218 can be used for communication between the first storage unit 216 and other functional units in the first device 102. The first storage interface 218 can also be used for communication that is external to the first device 102.

The first storage interface 218 can receive information from the other functional units or circuits or from external sources, or can transmit information to the other functional units or circuits or to external destinations. The external sources and the external destinations refer to sources and destinations external to the first device 102.

The first storage interface 218 can include different implementations depending on which functional units or circuits or external units or circuits are being interfaced with the first storage unit 216. The first storage interface 218 can be implemented with technologies and techniques similar to the implementation of the first control interface 212.

The first communication unit 202 can enable external communication to and from the first device 102. For example, the first communication unit 202 can permit the first device 102 to communicate with the second device 106, an attachment, such as a peripheral device or a computer desktop, and the communication path 104.

The first communication unit 202 can also function as a communication hub allowing the first device 102 to function as part of the communication path 104 and not be limited to be an end point or terminal unit to the communication path 104. The first communication unit 202 can include active and passive components, such as microelectronics or an antenna, for interaction with the communication path 104.

The first communication unit 202 can include a first communication interface 208. The first communication interface 208 can be used for communication between the first communication unit 202 and other functional units or circuits in the first device 102. The first communication interface 208 can receive information from the other functional units or circuits or from external sources, or can transmit information to the other functional units or circuits or to external destinations. The external sources and the external destinations refer to sources and destinations external to the first device 102.

The first communication interface 208 can include different implementations depending on which functional units or circuits are being interfaced with the first communication unit 202. The first communication interface 208 can be implemented with technologies and techniques similar to the implementation of the first control interface 212.

The first communication unit 202 can couple with the communication path 104 to send information to the second device 106 in the first device transmission 222. The second device 106 can receive information in a second communication unit 226 from the first device transmission 222 of the communication path 104.

The first control unit 210 can operate the first user interface 254 to present information generated by the computing system 100. The first user interface 254, in one embodiment, allows a user of the computing system 100 to interface with the first device 102. The first user interface 254 can include an input device and an output device. Examples of the input device of the first user interface 254 can include a keypad, a touchpad, soft-keys, a keyboard, a microphone, sensors for receiving remote signals, or any combination thereof to provide data and communication inputs. Examples of the output device can include a first display interface 206 and a first audio interface 204.

The first control unit 210 can operate the first user interface 254 to present information generated by the computing system 100. The first control unit 210 can also execute the first software 220 for the other functions of the computing system 100. The first control unit 210 can further execute the first software 220 for interaction with the communication path 104 via the first communication unit 202.

The first display interface 206 can be any graphical user interface such as a display, a projector, a video screen, or any combination thereof. The first audio interface 204 can include sensors, speakers, microphones, headphones, subwoofers, surround sound components, transducers, or any combination thereof. The first display interface 206 and the first audio interface 204 allow a user of the computing system 100 to interact with the computing system 100.

The first location unit 214 can generate location information, current heading, current acceleration, and current speed of the first device 102, as examples. The first location unit 214 can be implemented in many ways. For example, the first location unit 214 can function as at least a part of a global positioning system (GPS), and can include components, such as a GPS receiver, an inertial navigation system, a gyroscope, a cellular-tower location system, a pressure location system, or any combination thereof.

The first location unit 214 can include a first location interface 250. The first location interface 250 can be used for communication between the first location unit 214 and other functional units or circuits in the first device 102. The first location interface 250 can also be used for communication that is external to the first device 102.

The first location interface 250 can include different implementations depending on which functional units or circuits or external units or circuits are being interfaced with the first location unit 214. The first location interface 250 can be implemented with technologies and techniques similar to the implementation of the first control interface 212.

The second device 106 can be optimized for implementing an embodiment of the present invention in a multiple device embodiment with the first device 102. The second device 106 can provide additional or higher performance processing power compared to the first device 102. The second device 106 can include a second control unit 238, a second storage unit 240, a second communication unit 226, a second user interface 228, and a second location unit 246.

The second control unit 238 can execute a second software 244 to provide the intelligence of the second device 106 of the computing system 100. The second software 244 can also operate independently or in conjunction with the first software 220. The second control unit 238 can provide additional performance compared to the first control unit 210.

The second control unit 238 can be implemented in a number of different ways. For example, the second control unit 238 can be a processor, an application specific integrated circuit (ASIC), an embedded processor, a microprocessor, a hardware control logic, a hardware finite state machine (FSM), a digital signal processor (DSP), or a combination thereof.

The second control unit 238 can include a second control interface 236. The second control interface 236 can be used for communication between the second control unit 238 and other functional units or circuits in the second device 106. The second control interface 236 can also be used for communication that is external to the second device 106. The second control interface 236 can receive information from the other functional units or circuits or from external sources, or can transmit information to the other functional units or circuits or to external destinations. The external sources and the external destinations refer to sources and destinations external to the second device 106.

The second control interface 236 can be implemented in different ways and can include different implementations depending on which functional units or circuits or external units are being interfaced with the second control interface 236. For example, the second control interface 236 can be implemented with a pressure sensor, an inertial sensor, a microelectromechanical system (MEMS), optical circuitry, waveguides, wireless circuitry, wireline circuitry, application programming interface, or a combination thereof.

The second storage unit 240 can store the second software 244. The second storage unit 240 can also store the information such as data representing incoming images, data representing previously presented image, sound files, or a combination thereof. The second storage unit 240 can be sized to provide the additional storage capacity to supplement the first storage unit 216.

For illustrative purposes, the second storage unit 240 is shown as a single element, although it is understood that the second storage unit 240 can be a distribution of storage elements. Also for illustrative purposes, the computing system 100 is shown with the second storage unit 240 as a single hierarchy storage system, although it is understood that the computing system 100 can have the second storage unit 240 in a different configuration. For example, the second storage unit 240 can be formed with different storage technologies forming a memory hierarchal system including different levels of caching, main memory, rotating media, or off-line storage.

The second storage unit 240 can be a volatile memory, a nonvolatile memory, an internal memory, an external memory, or a combination thereof. For example, the second storage unit 240 can be a nonvolatile storage such as non-volatile random access memory (NVRAM), Flash memory, disk storage, or a volatile storage such as static random access memory (SRAM).

The second storage unit 240 can include a second storage interface 242. The second storage interface 242 can be used for communication between the second storage unit 240 and other functional units or circuits in the second device 106. The second storage interface 242 can also be used for communication that is external to the second device 106.

The second storage interface 242 can receive information from the other functional units or circuits or from external sources, or can transmit information to the other functional units or circuits or to external destinations. The external sources and the external destinations refer to sources and destinations external to the second device 106.

The second storage interface 242 can include different implementations depending on which functional units or circuits or external units or circuits are being interfaced with the second storage unit 240. The second storage interface 242 can be implemented with technologies and techniques similar to the implementation of the second control interface 236.

The second communication unit 226 can enable external communication to and from the second device 106. For example, the second communication unit 226 can permit the second device 106 to communicate with the first device 102, an attachment, such as a peripheral device or a computer desktop, and the communication path 104.

The second communication unit 226 can also function as a communication hub allowing the second device 106 to function as part of the communication path 104 and not be limited to be an end point or terminal unit or circuit to the communication path 104. The second communication unit 226 can include active and passive components, such as microelectronics or an antenna, for interaction with the communication path 104.

The second communication unit 226 can include a second communication interface 230. The second communication interface 230 can be used for communication between the second communication unit 226 and other functional units in the second device 106. The second communication interface 230 can receive information from the other functional units or circuits or from external sources, or can transmit information to the other functional units or circuits or to external destinations. The external sources and the external destinations refer to sources and destinations external to the second device 106.

The second communication interface 230 can include different implementations depending on which functional units or circuits are being interfaced with the second communication unit 226. The second communication interface 230 can be implemented with technologies and techniques similar to the implementation of the second control interface 236.

The second communication unit 226 can couple with the communication path 104 to send information to the first device 102 in the second device transmission 224. The first device 102 can receive information in the first communication unit 202 from the second device transmission 224 of the communication path 104

The second control unit 238 can operate the second user interface 228 to present information generated by the computing system 100. The second user interface 228, in one embodiment, allows a user (not shown) of the computing system 100 to interface with the second device 106. The second user interface 228 can include an input device and an output device. Examples of the input device of the second user interface 228 can include a keypad, a touchpad, softkeys, a keyboard, a microphone, sensors for receiving remote signals, or any combination thereof to provide data and communication inputs. Examples of the output device can include a second display interface 234 and a second audio interface 232.

The second control unit 238 can operate the second user interface 228 to present information generated by the computing system 100. The second control unit 238 can also execute the second software 244 for the other functions of the computing system 100. The second control unit 238 can further execute the second software 244 for interaction with the communication path 104 via the second communication unit 226.

The second display interface 234 can be any graphical user interface such as a display, a projector, a video screen, or any combination thereof. The second audio interface 232 can include sensors, speakers, microphones, headphones, subwoofers, surround sound components, transducers, or any combination thereof. The second display interface 234 and the second audio interface 232 allow a user of the computing system 100 to interact with the computing system 100.

The second location unit 246 can generate location information, current heading, current acceleration, and current speed of the second device 106, as examples. The second location unit 246 can be implemented in many ways. For example, the second location unit 246 can function as at least a part of a global positioning system (GPS) and can include components, such as a GPS receiver, an inertial navigation system, a cellular-tower location system, or any combination thereof.

The second location unit 246 can include a second location interface 252. The second location interface 252 can be used for communication between the second location unit 246 and other functional units or circuits in the second device 106. The second location interface 252 can also be used for communication that is external to the second device 106. The second location interface 252 can be implemented with technologies and techniques similar to the implementation of the second control interface 236.

Functionality of the computing system 100 can be provided by the first control unit 210, the second control unit 238, or a combination thereof. For illustrative purposes, the second device 106 is shown with the partition having the second user interface 228, the second storage unit 240, the second control unit 238, the second location unit 246, and the second communication unit 226, although it is understood that the second device 106 can have a different partition. For example, the second software 244 can be partitioned differently such that some or all of its function can be in the second control unit 238 and the second communication unit 226. Also, the second device 106 can include other functional units not shown in FIG. 2 for clarity.

The first device 102 can have a similar or different partition as the second device 106. The functional units or circuits in the first device 102 can work individually and independently of the other functional units or circuits. The first device 102 can work individually and independently from the second device 106 and the communication path 104.

The functional units in the second device 106 can work individually and independently of the other functional units or circuits. The second device 106 can work individually and independently from the first device 102 and the communication path 104.

The functional units or circuits described above can be implemented in hardware. For example, one or more of the functional units or circuits can be implemented using a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

For illustrative purposes, the computing system 100 is described by operation of the first device 102 and the second device 106. It is understood that the first device 102 and the second device 106 can operate any of the modules, units, and functions of the computing system 100.

Figure 3:
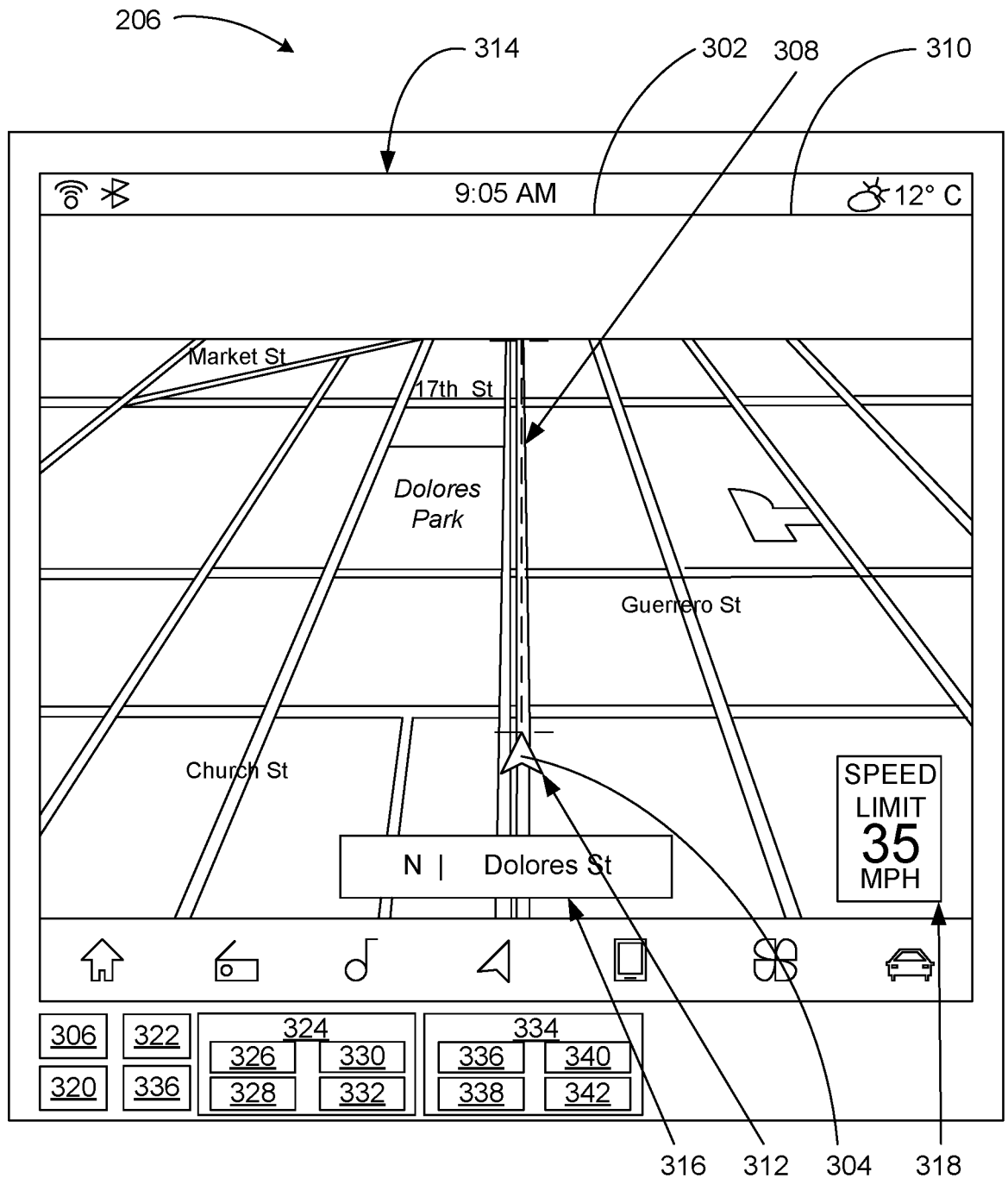
FIG. 3 is an exemplary display of the computing system with an active map area and a current zoom level.

Referring now to FIG. 3, therein is shown an exemplary display of the computing system 100 of FIG. 1 with an active map area 302 and a current zoom level 306. The active map area 302 is the size and proportion of the first display interface 206 of FIG. 2, the second display interface 234 of FIG. 2, or a combination thereof that displays a map 310. The computing system 100 can obtain the width, height, and aspect ratio of the active map area 302 utilizing the first control unit 210 of FIG. 2, the second control unit 238 of FIG. 2, or a combination thereof. The computing system 100 can also obtain the measurements for the active map area 302 from the first display interface 206, the second display interface 234, or a combination thereof.

The map 310 is a visual representation of a geographic area. For example, the map 310 can be a representation of a state, a city, a town, a neighborhood, or any portion thereof. As a further example, the map 310 can represent the roadways in the geographic area. The map 310 can be displayed by the first display interface 206 of FIG. 2, the second display interface 234 of FIG. 2, or a combination thereof. The map 310 can be displayed in relation to a current location 304.

The current location 304 is generated by the first location unit 214 of FIG. 2, the second location unit 246 of FIG. 2, or a combination thereof. For example, the current location 304 provide a location of the first device 102 of FIG. 1 or the second device 106 of FIG. 1. The current location 304 can be generated in a number of ways. For example, the current location 304 can be determined by a global positioning system (GPS), cellular triangulation, wireless fidelity (WiFi) triangulation, dead reckoning, or a combination thereof. The computing system 100, the first device 102 of FIG. 1, the second device 106 of FIG. 2, or a combination thereof can track the current location 304 dynamically and in real time.

The computing system 100 tracking the current location 304 "dynamically" refers to the receiving, monitoring, or a combination thereof of the current location 304 that is non-static or by potentially differing mechanism. The computing system 100 tracking the current location 304 "real time" refers to the receiving, monitoring, or a combination thereof of the current location 304 at the time of reading for the current location 304 is taken regardless of the mechanism at some time period. The computing system 100 can display the current location 304 on the first display interface 206, the second display interface 234, or a combination thereof.

The computing system 100 can display the current location 304 in a directionality 312. The directionality 312 is the orientation towards that for movement. The directionality 312 can be determined by calculating the change in the current location 304 or based on dead reckoning, such as with an accelerometer or a gyroscope in the first location unit 214, the second location unit 246, or a combination thereof. For example, the directionality 312 can be determined based on the change in degrees of latitude, longitude, altitude, or a combination thereof, of the current location 304.

The computing system 100 can utilize the current location 304 to obtain map information 314. The map information 314 refers to a diagram or a collection of data representing an arrangement or distribution of geographic features, physical features, non-physical features, or a combination thereof of the geographic location on a map. For example, the map information 314 can include a physical feature such as a path, a road sign, street name, an infrastructure, a geographical feature, a natural topology, points of interest, buildings, bodies of water, or a combination thereof. As a further example, the map information 314 can also include a non-physical feature such as a speed limit, a one-way designation, an address, points of interest (POI) or a combination thereof. The aforementioned list is not meant to be limiting.

The computing system 100 can request and receive the map information 314 using the first communication unit 214 of FIG. 2, the second communication unit 226 of FIG. 2, or a combination thereof. The computing system 100 can cache the map information 314 using the first storage unit 216 of FIG. 2, the second storage unit 240 of FIG. 2, an external database, or a combination thereof.

The computing system 100 can obtain the map information 314 to determine a current road segment 316, a current speed limit 318, a current road type 320 or a combination thereof. The current road segment 316 is the roadway or a portion of the roadway on which the user is currently travelling. For example, the current road segment 316 can be a street, an alleyway, a highway, a freeway, a parkway, an expressway, a toll road, a residential road, or an unpaved path. The aforementioned list is not meant to be limiting. The current road segment 316 can be determined based on the current location 304.

The current speed limit 318 is the designated maximum legal travel rate for a current road segment 316. For example, the computing system 100 can determine the current speed limit 318 from the map information 314 obtained from the second device 106, an external entity, an external system, or a combination thereof. As a further example, the computing system 100 can determine the current speed limit 318 utilizing sensors such as a camera, an infrared detector, a radar detector, a light detection and ranging (LIDAR) unit, or a combination thereof.

The current road type 320 is the classification of a roadway. The current road type 320 can be classified in a number of ways. For example, the current road type 320 can be based on a segment speed limit 336, traffic conditions, traffic limiters as traffic lights or stop signs, or designation has highway or expressway or freeway, residential area, or a combination thereof. The segment speed limit 336 is the estimated speed limit for the current road segment 316 when the current speed limit 306 is unavailable or unobtainable. The segment speed limit 336 can be determined by a number of factors. For example, the segment speed limit 336 can be based on the number of lanes, the number of intersections, the speed limit of roadways nearby, the geographic area, or a combination thereof. The aforementioned list is not meant to be a limiting and closed list but described as examples. The segment speed limit 336 can be determined utilizing the map 310, the map information 314, or a combination thereof.

Continuing with the example, the current zoom level 306 can be displayed on the first display interface 206, the second display interface 234, or a combination thereof. The current zoom level 306 is a view of the map 310 based on a look ahead distance 308. The look ahead distance 308 is the physical distance between the current location 304 and the real world location of the top edge of the map 310 displayed the active map area 302. The look ahead distance 308 is calculated based on a minimum distance 334 and a look ahead distance multiplier 322.

The minimum distance 334 is the minimum value for the look ahead distance 308 based on a range of speed limits. The minimum distance 334 can be predefined. The minimum distance 334 can be represented using categorizations. The categorizations can indicate the ranges of speed limits.

For example, the categorizations can be a low speed distance 336, a mid speed distance 338, a high speed distance 340, and a max speed distance 342.

The low speed distance 336 requires the shortest instance of the minimum distance 334. For example, the low speed distance 336 can require the minimum distance 334 of 1000 feet when speed limit is below 30 miles per hour. The mid speed distance 338 provides an instance of the minimum distance 334 that is longer than the low speed distance 336 and shorter than the high speed distance 340. For example, the mid speed distance 338 can provide the minimum distance 334 of 2000 feet when the speed limit is at least 30 miles per hour and below 45 miles per hour.

The high speed distance 340 can require an instance of the minimum distance 334 that is longer than the mid speed distance 338 and shorter than the max speed distance 342. For example, the high speed distance 340 can require the minimum distance 334 of 0.8 miles when the speed limit is at least 45 miles per hour and below 65 miles per hour. The max speed distance 342 can require an instance of the minimum distance 334 that is longer than the higher speed distance 340. For example, the max speed distance 342 can require the minimum distance 334 of 1.6 miles when the speed limit is at least 65 miles per hour. The computing system 100 can obtain the minimum distance 334 from the second device 106, an external entity, an external system, or a combination thereof. The computing system 100 can store the minimum distance 334 in the first storage interface 216, the second storage interface 240, or a combination thereof.

The look ahead distance multiplier 322 is a value of at least 1 that is multiplied with the minimum distance 334 to obtain the look ahead distance 308. The look ahead distance multiplier 322 adjusts the minimum distance 334 based on the active map area 302. The look ahead distance multiplier 322 can increase when the width-to-height ratio of the active map area 302 decreases. For example, the look ahead distance multiplier 322 can be 1.2 when the active map area 302 of the first display interface 206 has a width to height ratio of 0.75. As a further example, the look ahead distance multiplier 322 can be 1.4 when the active map area 302 of the second display interface 234 has a width to height ratio of 0.5. The computing system 100 can calculate the look ahead distance multiplier 322 with the first control unit 210, the second control unit 238, or a combination thereof. The computing system 100 can calculate the look ahead distance 308 by multiplying the minimum distance 334 with the look ahead distance multiplier 322 with the first control unit 210, the second control unit 238, or a combination thereof.

The computing system 100 can generate a camera view 324 based on the look ahead distance 308. The camera view 324 is the degree of inclination angle and magnification of the map 310 displayed in the active map area 302. The camera view 324 can be represented using categorizations. The categorizations can indicate the ranges of the look ahead distance 308. For example, the categorizations can be a low speed view 311, a mid speed view 313, a high speed view 315, and a max speed view 317.

The low speed view 326 can represent the camera view 324 of the map 310 that provides the shortest instance of the look ahead distance 308. For example, the low speed zoom 326 can provides the smallest view of the map 310 from the point of view directly above the current location 304, also known as an overhead view. The mid speed zoom 328 can represent the camera view 324 of the map 310 that provides an instance of the look ahead distance 308 that is longer than the low speed zoom 326 and shorter than the high speed zoom 330. For example, the mid speed zoom 328 can provide a view of the map 310 that is larger than the low speed zoom 326 and smaller than the high speed zoom 330 from the point of view that is angled at a low degree of inclination, also known as bird's-eye view.

The high speed zoom 330 can represent the camera view 324 of the map 310 that provides an instance of the look ahead distance 308 that is longer than the mid speed zoom 328 and shorter than the max speed zoom 332. For example, the high speed zoom 330 can provide a view of the map 310 that is larger than mid speed zoom 328 and smaller than the max speed zoom 332 from the point of view that is angled at a higher degree of inclination than the mid speed zoom 328. The max speed zoom 332 can represents the camera view 324 of the map 310 that provides an instance of the look ahead distance 308 that is longer than the higher speed zoom 330. For example, the max speed zoom 332 can provide the largest view of the map 310 from the point of view that is angled at the highest degree of inclination.

The computing system 100 can generate the camera view 324 as the low speed zoom 326, the mid speed zoom 328, the high speed zoom 330, the max speed zoom 332 based on the look ahead distance 308. The computing system 100 can generate the camera view 324 with the first control unit 210, the second control unit 238, or a combination thereof. The computing system 100 can generate the camera view 324 with the first control unit 210, the second control unit 238, or a combination thereof.

Continuing with the example, the computing system 100 can generate the current zoom level 306 by generating the camera view 324 based on the look ahead distance 308 for the current speed limit 318, the current road type 320, or a combination thereof. The computing system 100 can generate the current zoom level 306 utilizing the camera view 324 and the look ahead distance 308 with the first control unit 210, the second control unit 238, or a combination thereof.

Figure 4:
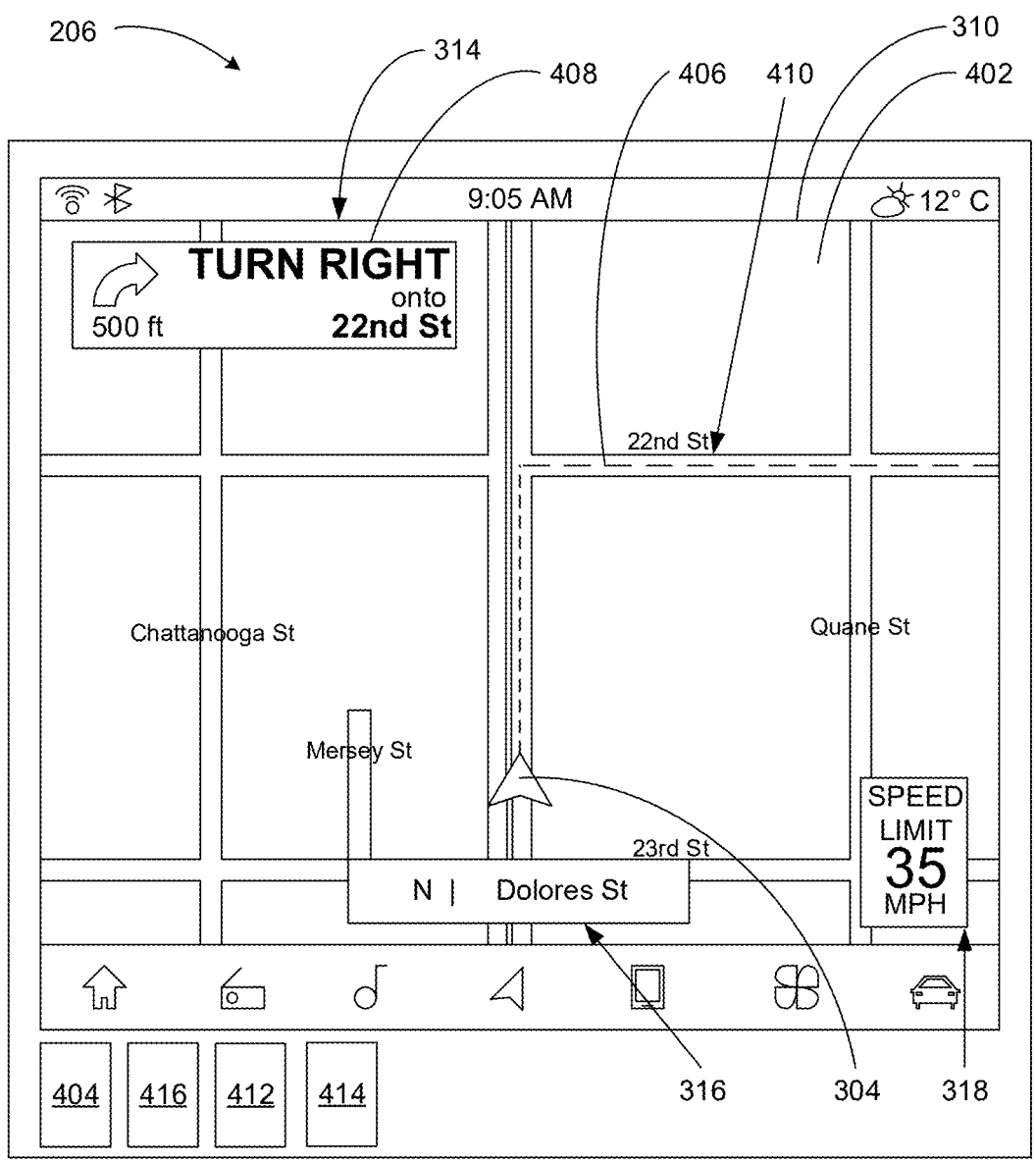
FIG. 4 is an exemplary display of the computing system when operating in an active guidance mode.

Referring now to FIG. 4, therein is an exemplary display interface of the computing system 100 of FIG. 1 when operating in an active guidance mode 402. The active guidance mode 402 refers to a mode of the computing system 100 where the computing system 100 calculates a route for the user to follow to reach a route destination 404. For example, the active guidance mode 402 can provide instructions for guidance of a route for the user or a vehicle to follow. As a specific example, the guidance can include step-by-step instructions to traverse the route.

The route destination 404 refers to a geographic location or point of interest that the user wants to navigate to. The route destination 404 can include the end point or the termination of the route or the guidance. The route destination 404 can also include waypoints or intermediate stops. For example, the route destination 404 can be a store, a landmark, an office building or site, a park, an address, a general geographic area, a street, a city or municipality, or a combination thereof. Also for example, a waypoint for the route can represent the route destination 404 when the guidance is terminated at that particular instance of the waypoint.

For brevity of description, in this embodiment, reference to the first display interface 206 and the first user interface 254 of FIG. 2 is made, however, the descriptions with respect to the first display interface 206 and the first user interface 256 can be similarly applicable to the second display interface 234 and the second user interface 228 of FIG. 2.

In one embodiment, the first display interface 206, in conjunction with the first user interface 254, can enable a user of the computing system 100 to input the route destination 404 to enable the active guidance mode 402 of the computing system 100. The user can input the route destination 404 by using alpha-numeric characters, symbols, voice commands, gestures, or a combination thereof. For example, the user can input the route destination 404 by interfacing with the first user interface 254, the second user interface 228, or a combination thereof. As a further example, the user can input the route destination 404 by interfacing with the first audio interface 204 of FIG. 2, the second audio interface 232 of FIG. 2, or a combination thereof.

Continuing with the example, once the route destination 404 is input by the user, the computing system 100 can determine a travel route 406 for the user to navigate. The travel route 406 is the path to navigate from a current location 304 to the route destination 404. For example, the travel route 406 can be determined based on closest distance to the route destination 404, fastest time of arrival to the route destination 404, avoidance of tolls to the route destination 404, or other constraints.

Continuing with the example, the first display interface 206 can display the travel route 406 and any additional instances of the travel route 406 generated based on the different constraints. For example, the navigation system 100 can display the travel route 406 based on the shortest distance to the route destination 404. As another example, the computing system 100 can display the travel route 406 based on a fastest time of arrival to the route destination 404. As a further example, the computing system 100 can display the travel route 406 based on road constraints, such as avoid toll roads or avoid freeways.

Continuing with the example, the first display interface 206 can display the current location 304. The current location 304 can represent the starting point that determines the travel route 406 to the route destination 404. The current location 304 can also represent the present location along the travel route 406 to the route destination 404.

Continuing with the example, the computing system 100 can provide step-by-step guidance to the user for a maneuver 408. The maneuver 408 is a movement or series of movement to continue on the current road segment 316 or to travel from the current road segment 316 to a further road segment 410. For example, the maneuver 408 can be a merger, a turn, a U-turn, a lane change, an exit, an entrance, a roundabout, or a combination thereof. The aforementioned list is not meant to be limiting. The computing system 100 can provide visual instructions to the user on the first display interface 206. As a further example, the computing system 100 can provide audible instructions to the user through the first audio interface 204, the second audio interface 232, or a combination thereof. The computing system 100 can determine the maneuver 408 from the map 310, the map information 314, or a combination thereof obtained from the second device 106, an external entity, an external system, or a combination thereof. As a further example, the computing system 100 can determine the maneuver 408 utilizing sensors such as a camera, an infrared detector, a radar detector, a light detection and ranging (LIDAR) unit, or a combination thereof.

The further road segment 410 is the roadway that is connected to the current road segment 316 with the maneuver 408. The further road segment 410 is not the current road segment 316. For example, the further road segment 410 can be the next roadway that the user will need to travel on the travel route 406 to the route destination 404. As a further example, the further road segment 410 can be the roadway that the user will enter upon completing the maneuver 408 from the current road segment 316. The computing system 100 can determine the further road segment 410 and any additional instances of the further road segment 410 with the first control unit 210, the second control unit 240, or a combination thereof.

The computing system 100 can determine a further speed limit 412 for the further road segment 410 and any additional instances of the further road segment 410. The further speed limit 412 is the designated maximum legal travel rate on the further road segment 410. The computing system 100 can determine the further speed limit 412 from the map 310 of FIG. 3, the map information 314 of FIG. 3, or a combination thereof. The further speed limit 412 can be obtained from the second device 106, an external entity, an external system, or a combination thereof. As a further example, the computing system 100 can determine the further speed limit 412 utilizing sensors such as a camera, an infrared detector, a radar detector, a light detection and ranging (LIDAR) unit, or a combination thereof.

The computing system 100 can automatically set a further zoom level 414 upon determining the further speed limit 412. The further zoom level 414 is the camera view 324 of the map 310 automatically set utilizing the look ahead distance 308 based on the further speed limit 412. For example, the further zoom level 414 can be set with the low speed view 311 when the further speed limit 412 requires the look ahead distance 308 based on the low speed distance 336. As a further example, the further zoom level can be set with the high speed view 315 when the further speed limit 412 requires the look ahead distance 308 based on the high speed distance 340.

The computing system 100 generate the further zoom level 414 "automatically" refers to the setting, generating, or a combination thereof of the further zoom level 414 for the further road segment 410 based on the further speed limit 412 without input from the user. The computing system 100 can generate the further zoom level 414 based on the look ahead distance 308 for the further speed limit 412 with the first control unit 210, the second control unit 238, or a combination thereof.

The computing system 100 can also automatically determine the further zoom level 414 based on a further road type 416. The further road type 416 is the classification of a roadway based on the segment speed limit 336 for the further road segment 416. For example, the further road type 416 can be determined to be the low speed road 338, the mid speed road 340, the high speed road 342, or the max speed road 344. The computing system 100 can determine the further road type 416 for the further road segment 410 when the further speed limit 412 is unobtainable or unavailable.

The computing system 100 can determine the segment speed limit 336 of the further road type 416 utilizing the map 310, the map information 314, or a combination thereof. For example, the computing system 100 can determine the segment speed limit 336 of the further road type 416 from the map information 314 obtained from the second device 106, an external entity, an external system, or a combination thereof.

The computing system 100 setting the further zoom level 414 "automatically" refers to the setting, generating, or a combination thereof of the further zoom level 414 for the further road segment 410 based on the further road type 416 without input from the user. The computing system 100 can set the further zoom level 414 with the first control unit 210, the second control unit 238, or a combination thereof. The computing system 100 can generate the further zoom level 414 based on the look ahead distance 308 for the further road type 416 with the first control unit 210, the second control unit 238, or a combination thereof.

Figure 5:
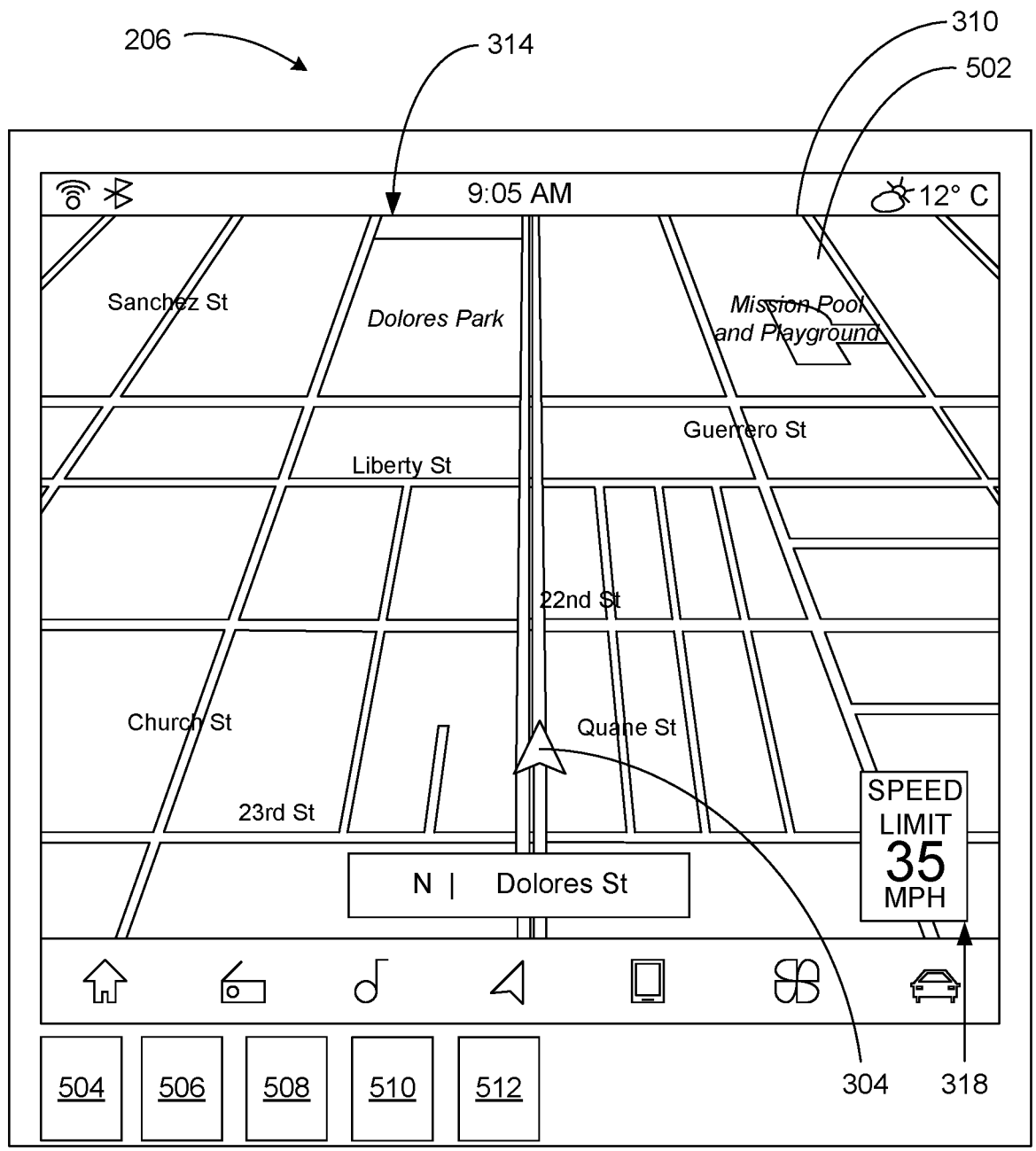
FIG. 5 is an exemplary display of the computing system when operating in a free drive mode.

Referring now to FIG. 5, an exemplary display of the computing system 100 of FIG. 1 when operating in a free drive mode 502. The free drive mode 502 refers to a mode of the computing system 100 where the computing system 100 operates without input of the route destination 404 of FIG. 4. The computing system 100 operates in the free drive mode 502 without the active guidance mode 402 of FIG. 4.

During operation in the free drive mode 502, the computing system 100 can be operating without a predetermined location for the route destination 404 of FIG. 4. The computing system 100, the first device 102 of FIG. 1, the second device 106 of FIG. 1, or a combination thereof can detect, send, receive, or a combination thereof the current location 304 while in the free drive mode 502. The current location 304 can be updated dynamically and in real time. The computing system 100 can track the current location 304 using the first location unit 214 of FIG. 2, the second location unit 246 of FIG. 2, or a combination thereof.

The computing system 100 can track a current travel speed 504 with the first device 102, the second device 106, or a combination thereof. The computing system 100 can track the current travel speed 504 using the first location unit 214 of FIG. 2, the second location unit 246 of FIG. 2, or a combination thereof. For example, the current travel speed 504 can be tracked based on the measurement for the current speed limit 318.

The computing system 100 can detect a speed change 506 based on the current speed limit 318, the current travel speed 504, or a combination thereof. The speed change 506 occurs when the current speed limit 318, the current travel speed 504, or combination thereof falls outside the range of the speed limits for the minimum distance 320 of the current zoom level 306. For example, the speed change 506 is detected when the current travel speed 504 exceeds the upper speed limit range of the minimum distance 320 of FIG. 3 of the current zoom level 306. The computing system 100 can detect the speed change 506 with the first device 102, the second device 106, or a combination thereof.

The computing system 100 can generate a speed zoom adjustment 508 upon detecting the speed change 506. The speed zoom adjustment 508 is the display of the map 310 utilizing the camera view 324 with instance of the minimum distance 320 based on the current speed limit 318, the current travel speed 504, or a combination thereof. The computing system 100 can generate the speed zoom adjustment 508 with the camera view 324 based on the current speed limit 318, the current travel speed 504, or a combination thereof using the first control unit 210 of FIG. 2, the second control unit 238 of FIG. 2, or a combination thereof. The computing system 100 can update the current zoom level 306 to the speed zoom adjustment 508 utilizing the first control unit 210, the second control unit 238, or a combination thereof.

Continuing with the example, the computing system 100 can track the current road type 320 of FIG. 3 to detect a segment change 510. The segment change 510 is a change in the current road type 320 while traveling on the current road segment 316. For example, the segment change 510 occurs when the current speed limit 318 changes while the current location 304 is detected on the current road segment 316. As a further example, the segment change 510 occurs when the current road type 320 changes while the current location 304 is detected on the current road segment 316. The computing system 100 can detect the segment change 510 by determining the current speed limit 318, the current road type 320, or a combination thereof from the map 310, the map information 314, or a combination thereof.

The computing system 100 can generate a segment zoom adjustment 512 upon detecting the segment change 510. The segment zoom adjustment 512 is the display of the map 310 utilizing the camera view 324 and the look ahead distance 308 based on the segment change 510. The computing system 100 can generate the segment zoom adjustment 512 based on the current road type 320 using the first control unit 210, the second control unit 238, or a combination thereof.

Figure 6:
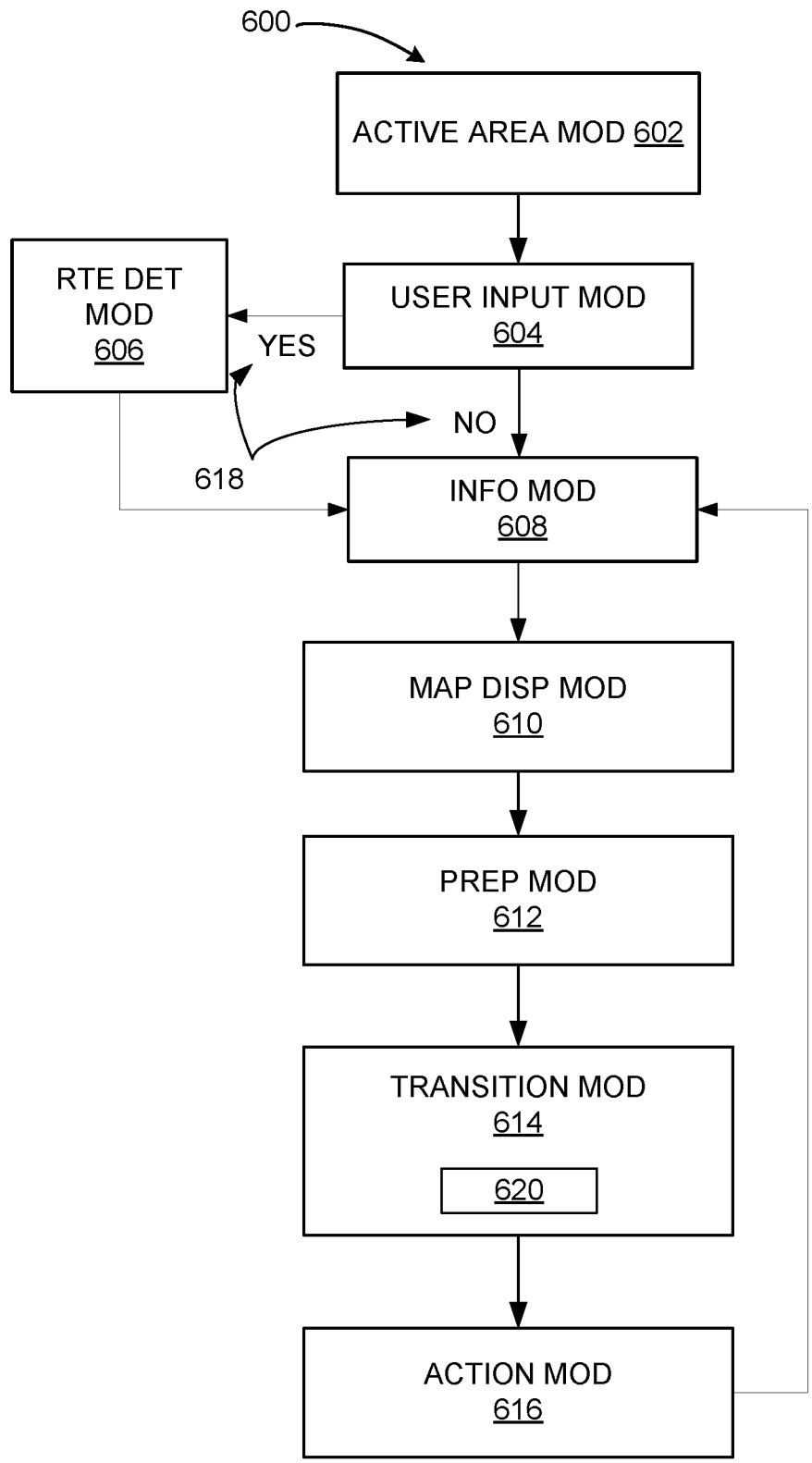
FIG. 6 is an exemplary control flow of the computing system.

Referring now to FIG. 6, therein is shown an exemplary control flow 600 of the computing system 100. In one embodiment, the computing system 100 can include an active area module 602, a user input module 604, a route determination module 606, an information module 608, a map display module 610, a preparation module 612, a transition module 614, and an action module 616.

As an example, the active area module 602 can be coupled to the user input module 604. The user input module 604 can be coupled to the route determination module 606 and the information module 610. The route determination module 606 can be coupled to the information module 610. The information module 610 can be coupled to the map display module 610. The map display module 610 can be coupled to the preparation module 612. The preparation module 612 can be coupled to the transition module 614. The transition module 614 can be coupled to the action module 616. The action module 616 can be coupled to the map display module 610.

The active area module 602 can determine the active map area 302 of FIG. 3 of the first display interface 206 of FIG. 2, the second interface 234 of FIG. 2, or a combination thereof. The active area module 602 can calculate the look ahead distance multiplier 322 based on the active map area 302. The active area module 602 can calculate the look ahead multiplier 322 with the first control unit 210 of FIG. 2, the second control unit 238 of FIG. 2, or a combination thereof. The active area module 602 can store the look ahead distance multiplier 332 on the first storage unit 216 of FIG. 2, the second storage unit 240 of FIG. 2, or a combination thereof. Once the active area module 602 determines the look ahead distance multiplier 322, control is passed to the user input module 604 to enable the receiving of the route destination 404 of FIG. 4 by the user of the computing system 100.

The user input module 604 can detect whether the user of the computing system 100 has input the route destination 404 of FIG. 4 by interfacing with the first user interface 254 of FIG. 2, the second user interface 228 of FIG. 2, or a combination thereof. The user input module 604 can set one or more of the flags 618 indicating that the user has input the route destination 404. The flags 618 refer to a software or hardware mark, variable, condition, or a combination thereof that signals a particular condition or status. For example, the user input module 604 can detect whether the user has input alpha-numeric characters or symbols indicating the route destination 404 by interfacing with the first display interface 206, the second display interface 234, or a combination thereof. If alpha-numeric characters or symbols are detected and the route destination 404 is verified, the active guidance module 402 of FIG. 4 can set one or more of the flags 618 to a value, for example "YES" or "1," to indicate that the route destination 404 has been input by the user.

As a further example, the user input module 604 can detect whether the user has input voice commands indicating the route destination 404 by interfacing with the first audio interface 204 of FIG. 2, the second audio interface 232 of FIG. 2, or a combination thereof. If the user input module 604 recognizes voice commands instructing the computing system 100 to find the route destination 404 and verifies the route destination 404, the user input module 604 can set one or more of the flags 618 to a value, for example "YES or "1," to indicate that the route destination 404 has been input by the user.

The user input module 604 can determine that the computing system 100 will operate in the active guidance mode 402 if the user input module 604 sets one or more of the flags 618 to a value indicating that the route destination 404 has been received. The computing system 100 can pass control to the route determination module 606 when operating in the active guidance mode 402.

Alternatively, the user input module 604 can determine that the computing system 100 is operating in the free drive mode 502 of FIG. 5 if the user input module 604 does not set one or more of the flags 618 to a value indicating that the route destination 404 has been received. The computing system 100 pass control to the information module 608 when operating in the free drive mode 502.

Continuing with the example, the user input module 604 can pass control to the route determination module 606 upon determining that the computing system 100 is operating in the active guidance mode 402. The route determination module 606 can determine the travel route 406 of FIG. 4 to the route destination 404, as described in FIG. 4. The determination of the travel route 406 can be done in any conventional manner known to a person of ordinary skill in the art, and in accordance to the description above with respect to FIG. 4.

Alternative, in another embodiment, the user input module 604 can pass control to the information module 608 upon determining that the computing system 100 is operating in the free drive mode 502. The information module 608 can obtain the current location 304 of FIG. 3, the directionality 312 of FIG. 3, the map 310 of FIG. 3, the map information 314 of FIG. 3, or a combination thereof.

The information module 608 can determine the current location 304 and track the current location 306 dynamically and in real-time. The current location 306 can be displayed in the directionality 312 of the user with first display interface 206 of FIG. 2, the second display interface 234 of FIG. 2, or a combination thereof. The information module 608 can obtain the map 310, the map information 314, or a combination thereof based on the current location 306.

The information module 608 can obtain the current location 304 from the first location unit 214, the second location unit 246, or a combination thereof. The information module 608 can obtain the map 310, the map information 314, or a combination thereof with the first communication unit 214, the second communication unit 226, or a combination thereof. For example, the information module 608 can obtain the current road segment 316 of FIG. 3, the current speed limit 318 of FIG. 3, the current road type 320 of FIG. 3, the current travel speed 504 of FIG. 5, or a combination thereof. Once the information module 608 determines the current speed limit 318, the current road type 320, the current travel speed 504, or a combination thereof, control is passed to the map display module 610 to set and display the current zoom level 306, the speed zoom adjustment 508, or the segment zoom adjustment 512.

The map display module 610 can generate the current zoom level 306 based on the current speed limit 318, the current road type 320, or a combination thereof. The map display module 610 can obtain the current speed limit 318, the current road type 320, or a combination thereof from the second device 106, an external entity, an external system, or a combination thereof. The map display module 610 can obtain the current speed limit 318, the current road type 320, or a combination thereof to determine the minimum distance 334 as the low speed distance 336 of FIG. 3, the mid speed distance 338 of FIG. 3, the high speed distance 340 of FIG. 3, or the max speed distance 342 of FIG. 3.

The map display module 610 can calculate the look ahead distance 308 based on the minimum distance 334 and the look ahead distance multiplier 322. The map display module 610 utilizes the look ahead distance 308 to set the camera view 324 to the low speed zoom 326 of FIG. 3, the mid speed zoom 328 of FIG. 3, the high speed zoom 330 of FIG. 3, or the max speed zoom 332 of FIG. 3. For example, the map display module 610 can determine that the current road type 320 is the low speed road 338 of FIG. 3 and set the low speed zoom 326 as the current zoom level 306. As a further example, the map display module 610 can determine that the current road type 320 is the high speed road 342 and set the high speed zoom 330 as the current zoom level 306.

The map display module 610 can generate the speed zoom adjustment 508 upon detecting the speed change 506. The map display module 610 can detect the speed change 506 by tracking the current travel speed 504.

The map display module 610 can determine the camera view 324 for the current zoom level 306 and the updated zoom level 506 with the first control unit 210, the second control unit 238, or a combination thereof. The map display module 610 can determine the current travel speed 506 with the first location unit 214, the second location unit 246, or a combination thereof. The map display module 610 can transmit the current zoom level 306 for displaying with the first communication unit 214, the second communication unit 226, or a combination thereof. Once the map display module 610 displays the current location 304, the directionality 312, the map 310, the map information 314, the current zoom level 306, the updated zoom level 506, or a combination thereof, control is passed to the preparation module 612 to set the further zoom level 414 of FIG. 4.

The preparation module 612 sets the further zoom level 414 for the further road segment 410 by determining the further speed limit 412, the further road type 416, or a combination thereof. In an embodiment where the computing system 100 is operating in the active guidance mode 402, the preparation module 612 can determine the further road segment 410 based on the travel route 406 and any additional instances of the travel route 406 to the route destination 404. The preparation module 612 can obtain the further speed limit 412, the further road type 416, or a combination thereof for the further road segment 410 along the travel route 406 and any additional instances of the travel route 406 to obtain the camera view 324 for the further zoom level 414.

In an alternative embodiment where the computing system 100 is operating in the free drive mode 502, the preparation module 612 can determine the further road segment 410 based on the directionality 312 of the user. The preparation module 612 can obtain the further speed limit 412, the further road type 416, or a combination for the further road segment 410 and any additional instances of the further road segment 410 connected to the current road segment 316 in the directionality 312 of the user. The preparation module 612 can obtain the further speed limit 412, the further road type 416, or a combination thereof for the further road segment 410 in the directionality 312 of the user to obtain the camera view 324 for the further zoom level 414.

The preparation module 612 can obtain the further road segment 410, the further speed limit 412, the further road type 416, the directionality 312, or a combination thereof from the map 310, the map information 314, or a combination thereof. Once the preparation module 612 sets the further zoom level 414, control is passed to the transition module 614 to generate a transition view 620 between the current zoom level 306 and the further zoom level 414.

The transition module 614 generates the transition view 620 to be displayed between the current zoom level 306 and the further zoom level 414. The transition view 620 is the camera view 324 that provides visual guidance for the maneuver 408, the further road segment 410, or a combination thereof. The transition module 614 can display the transition view 620 when the current location 304 is located a before the maneuver 408 or located on the maneuver 408. For example, the transition view 620 can provide the camera view 324 of the maneuver 408, the further road segment 410, or a combination thereof when the current location 304 is determined to be 20 feet before the maneuver 408. As a further example, the transition view 620 can provide the camera view 324 of a left turn when the current location 304 is determined to be on the maneuver 408 for a left turn.

The transition module 614 can generate the transition view 620 to display the maneuver 408, the further road segment 410, or a combination thereof with the first control unit 210, the second control unit 238, or a combination thereof. The transition module 614 can update the current zoom level 306 to the transition view 620 on the first display interface 206, the second display interface 234, or a combination thereof when the current location 304 is located on the maneuver 408. Once the transition module 614 displays the transition view 620, control is passed to the action module 616 to display the further zoom level 414 as the current zoom level 306.

The action module 616 sets the further zoom level 414 as the current zoom level 306 by determining that the current location 304 is on the further road segment 410. The action module 616 determines that the current location 304 to be on the further road segment 410 with the first location unit 214, the second location unit 246, or a combination thereof. Once the further zoom level 414 is set as the current zoom level 306, the control is passed to the map display module 610.

It has been discovered that the computing system 100 with the auto-zoom mechanism allows users of the computing system 100 greater efficiency and reliability during navigation because it allows the computing system 100 provide views of the map 310 with the look ahead distance 308 based on the current speed limit 318.

It has been further discovered that the computing system 100 with the auto-zoom mechanism promotes and provides greater safety for users of the computing system 100 over conventional methods because it allows users to avoid having to manually adjust the camera view 324 while traveling. For example, the user of the computing system 100 can avoid having to manually adjust the camera view 324 while operating a vehicle.

It has been further discovered that the computing system 100 with the auto-zoom mechanism allows the computing system 100 greater efficiency and reliability during navigation because it allows the computing system 100 to set the further zoom level 414 before the current location 304 is located on the further road segment 410.

It has been further discovered that the computing system 100 with the auto-zoom mechanism allows the computing system 100 greater efficiency and reliability by determining the active map area 302 and the look ahead distance multiplier 322 for displaying the current zoom level 306, the further zoom level 414, the updated zoom level 506, or a combination thereof to provide the look ahead distance 308 based on the width to height ratio of the display.

The modules described in this application can be hardware implementation or hardware accelerators, including passive circuitry, activity circuitry, or both, in the first storage unit 216, the second storage unit 240, the first control unit 210, the second control unit 238, or a combination thereof. The module can also be hardware implementation or hardware accelerators, including passive circuitry, active circuitry, or both, within the first device 102, the second device 106, or a combination thereof but outside the first storage unit 216, the second storage unit 240, the first control unit 210, the second control unit 238, or a combination thereof.

The computing system 100 has been described with module functions or order as an example. The computing system 100 can partition the modules differently or order the modules differently. For example, the first software 220 of FIG. 2 of the first device 102 can include the modules for the computing system 100. As a specific example, the first software 220 can include the active area module 602, the user input module 604, the route determination module 606, the information module 608, the map display module 610, the preparation module 612, the transition module 614, and the action module 616, and associated sub-modules included therein.

The first control unit 210 can execute the first software 220 to operate the modules. For example, the first control unit 210 can implement the active area module 602, the user input module 604, the route determination module 606, the information module 608, the map display module 610, the preparation module 612, the transition module 614, and the action module 616, and associated sub-modules included therein.

In another example of module partitions, the second software 244 of FIG. 2 of the second device 106 can include the modules for the computing system 100. As a specific example, the second software 244 can include the active area module 602, the user input module 604, the route determination module 606, the information module 608, the map display module 610, the preparation module 612, the transition module 614, and the action module 616, and associated sub-modules included therein.

The second control unit can execute the second software 244 to operate the modules. For example, the second control unit 238 can implement the active area module 602, the user input module 604, the route determination module 606, the information module 608, the map display module 610, the preparation module 612, the transition module 614, and the action module 616, and associated sub-modules included therein.

The computing system 100 has been described with module functions or order as an example. The computing system 100 can partition the modules differently or order the modules differently. For example, the various modules can be implemented in a different device, or the functionalities of the modules can be distributed across multiple devices. Also as an example, the various modules can be stored in a non-transitory memory medium.

The modules described in this application can be implemented as instructions stored on a non-transitory computer readable medium to be executed by a first control unit 210, the second control unit 238, or a combination thereof. The non-transitory computer readable medium can include the first storage unit 216, the second storage unit 240, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the computing system 100 or installed as a removable portion of the computing system 100.

Figure 7:
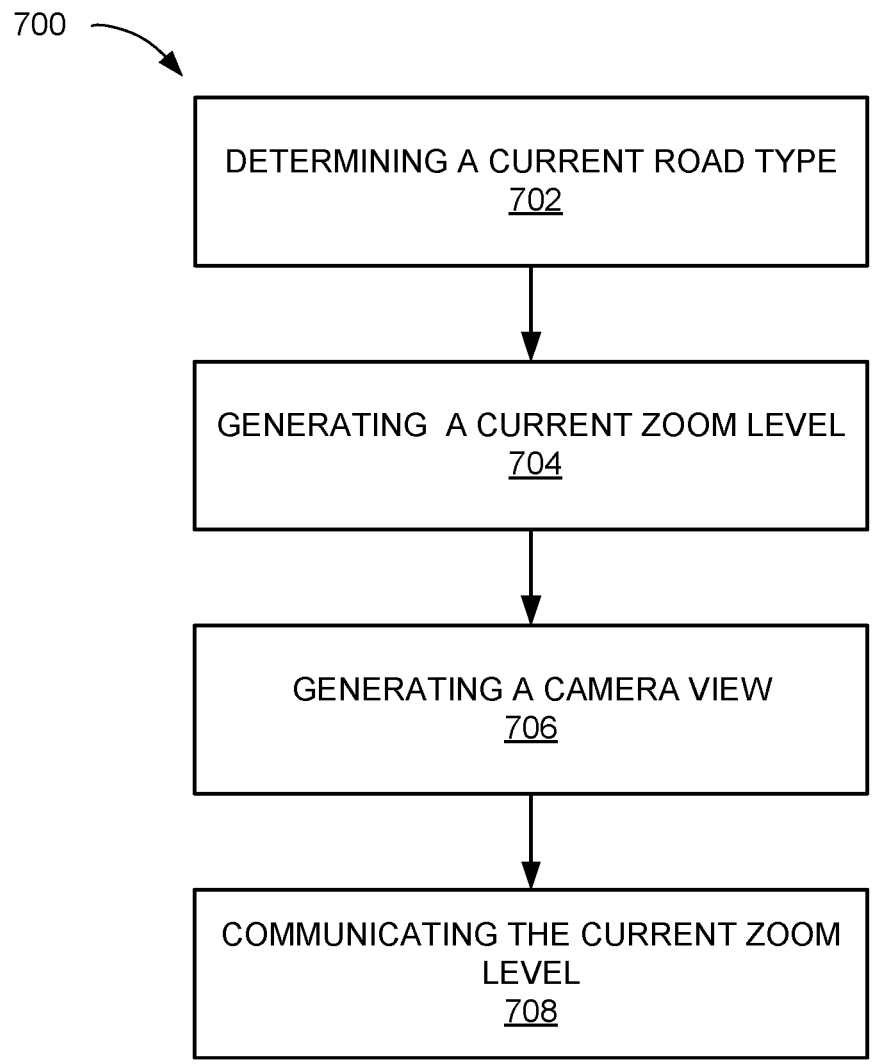
FIG. 7 is an exemplary flow chart of a method of operation of the computing system in a further embodiment of the present invention.

Referring now to FIG. 7, therein is shown an exemplary flow chart of a method 700 of operation of a computing system 100 in a further embodiment of the present invention. The method 700 includes: a current road type for a current road segment based on a current location located along the current road segment in a box 702; generating a current zoom level of a map including the current location on the current road segment based on the current road type in a box 704; generating a camera view of the map based on a look ahead distance for the current road type in a box 706; and communicating the current zoom level for displaying the current location along the current road segment in a box 708.

The method further includes generating the current zoom level based on a current speed limit of the current road segment. The method 700 further includes detecting a current travel speed; generating a speed zoom adjustment based on the current travel speed; and updating the current zoom level to the speed zoom adjustment based on the current travel speed.

The method 700 further includes determining a maneuver from the current road segment to a further road segment representing a further road type; generating a further zoom level based on the further road type; and updating the current zoom level to the further zoom level based on the current location associated with the maneuver.

The method 700 further includes detecting a segment change along the current road segment; generating a segment zoom adjustment based on the segment change along the current road segment; and updating the current zoom level with the segment zoom adjustment.

The method 700 further includes detecting the current location entering a maneuver; generating a transition view for the maneuver and a further road segment based on the current location; and updating the current zoom level to the transition view when the current location associated with the maneuver. The method 700 further includes calculating a look ahead distance multiplier based on an active map area.

The resulting method, process, apparatus, device, product, and system is cost-effective, highly versatile, and accurate, and can be implemented by adapting components for ready, efficient, and economical manufacturing, application, and utilization. Another important aspect of an embodiment of the present invention is that it valuably supports and services the historical trend of reducing costs, simplifying systems, and increasing performance.

These and other valuable aspects of the embodiments of the present invention consequently further the state of the technology to at least the next level. While the invention has been described in conjunction with a specific best mode, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a computing system comprising:
   determining an active map area of a display from a display interface including obtaining a width, a height, and an aspect ratio of the active map area;
   determining a current road type for a current road segment based on a current location, generated by a location unit, located along the current road segment;
   generating a current zoom level of a map including the current location on the current road segment based on the current road type;
   generating a camera view of the map based on a look ahead distance including a minimum distance based on a range of speed limits for the current road type multiplied by a look ahead distance multiplier based on the width, the height, and the aspect ratio of the active map area; and
   communicating the current zoom level, the camera view, the look ahead distance, or a combination thereof for displaying the current location along the current road segment in the active map area of the display interface.

2. The method as claimed in claim 1 wherein generating the current zoom level of the map includes generating the current zoom level based on a current speed limit of the current road segment.

3. The method as claimed in claim 1 further comprising:
   detecting a current travel speed;
   generating a speed zoom adjustment based on the current travel speed; and
   updating the current zoom level to the speed zoom adjustment based on the current travel speed.

4. The method as claimed in claim 1 further comprising:
   determining a maneuver from the current road segment to a further road segment representing a further road type;
   generating a further zoom level based on the further road type; and
   updating the current zoom level to the further zoom level based on the current location associated with the maneuver.

5. The method as claimed in claim 1 further comprising:
   detecting a segment change along the current road segment;
   generating a segment zoom adjustment based on the segment change along the current road segment; and
   updating the current zoom level with the segment zoom adjustment.

6. The method as claimed in claim 1 further comprising:
   detecting the current location entering a maneuver;
   generating a transition view for the maneuver and a further road segment based on the current location; and
   updating the current zoom level to the transition view when the current location is located on the maneuver.

7. The method as claimed in claim 1 wherein generating the current zoom level of the map includes calculating & the look ahead distance multiplier based on the active map area.

8. A computing system comprising:
   a control unit including a processor configured to:
   determine an active map area of a display from a display interface including obtaining a width, a height, and an aspect ratio of the active map area
   determine a current road type for a current road segment based on a current location, generated by a location unit, located along the current road segment;

generate a current zoom level of a map including the current location on the current road segment based on the current road type;

generate a camera view of the map based on a look ahead distance including a minimum distance based on a range of speed limits for the current road type multiplied by a look ahead distance multiplier based on the width, the height and the aspect ratio of the active map area; and a communication unit including microelectronics, coupled to the control unit, configured to:

communicate the current zoom level, the camera view, the look ahead distance, or a combination thereof for displaying the current location along the current road segment in the active map area of the display interface.

9. The system as claimed in claim 8 wherein the control unit is further configured to generate the current zoom level based on a current speed limit of the current road segment.

10. The system as claimed in claim 8 wherein the control unit is further configured to:

detect a current travel speed;

generate a speed zoom adjustment based on the current travel speed; and update the current zoom level to the speed zoom adjustment based on the current travel speed.

11. The system as claimed in claim 8 wherein the control unit is further configured to:

determine a maneuver from the current road segment to a further road segment representing a further road type;

generate a further zoom level based on the further road type; and update the current zoom level to the further zoom level when the current location is located along the further road segment.

12. The system as claimed in claim 8 wherein the control unit is further configured to:

detect a segment change along the current road segment;

generate a segment zoom adjustment based on the segment change along the current road segment; and update the current zoom level with the segment zoom adjustment.

13. The system as claimed in claim 8 wherein the control unit is further configured to:

detect the current location entering a maneuver;

generate a transition view for the maneuver and a further road segment based on the current location; and update the current zoom level to the transition view when the current location is located on the maneuver.

14. The system as claimed in claim 8 wherein the control unit is further configured to calculate the look ahead distance multiplier based on the active map area.

15. A non-transitory computer readable medium including instructions executable by a control unit for a computing system comprising:

determining an active map area of a display from a display interface including obtaining a width, a height, and an aspect ratio of the active map area;

determining a current road type for a current road segment based on a current location, generated by a location unit, located along the current road segment;

generating a current zoom level of a map including the current location on the current road segment based on the current road type;

generating a camera view of the map based on a look ahead distance including a minimum distance based on a range of speed limits for the current road type multiplied by a look ahead distance multiplier based on the width, the height, and the aspect ratio of the active map area; and communicating the current zoom level, the camera view, the look ahead distance, or a combination thereof for displaying the current location along the current road segment in the active map area of the display interface.

16. A non-transitory computer readable medium as claimed in claim 15 further comprising generating the current zoom level based on a current speed limit of the current road segment.

17. A non-transitory computer readable medium as claimed in claim 15 further comprising:

detecting a current travel speed;

generating an updated zoom level based on the current travel speed; and updating the current zoom level to a speed zoom adjustment based on the current travel speed.

18. A non-transitory computer readable medium as claimed in claim 15 further comprising:

determining a maneuver from the current road segment to a further road segment representing a further road type;

generating a further zoom level based on the further road type; and updating the current zoom level to the further zoom level when the current location is located along the further road segment.

19. A non-transitory computer readable medium as claimed in claim 15 further comprising:

detecting a segment change along the current road segment;

generating a segment zoom adjustment based on the segment change along the current road segment; and updating the current zoom level with the segment zoom adjustment.

20. A non-transitory computer readable medium as claimed in claim 15 further comprising:

detecting the current location entering a maneuver;

generating a transition view for the maneuver and a further road segment based on the current location; and updating the current zoom level to the transition view when the current location is located on the maneuver.

* * * * *